United States Patent [19]

Kadle

[11] Patent Number: 5,099,913
[45] Date of Patent: Mar. 31, 1992

[54] TUBULAR PLATE PASS FOR HEAT EXCHANGER WITH HIGH VOLUME GAS EXPANSION SIDE

[75] Inventor: Durgaprasad S. Kadle, Getzville, N.Y.

[73] Assignee: General Motors Corporation, Detroit, Mich.

[21] Appl. No.: 474,891

[22] Filed: Feb. 5, 1990

[51] Int. Cl.$^5$ .............................. F28F 13/08
[52] U.S. Cl. .................. 165/147; 165/152; 165/153; 62/526
[58] Field of Search ............ 165/153, 146, 147, 166, 165/167, 152; 62/526

[56] References Cited

U.S. PATENT DOCUMENTS

| | | | |
|---|---|---|---|
| 3,631,923 | 1/1972 | Izeki | 165/167 |
| 4,370,868 | 2/1983 | Kim et al. | 62/504 |
| 4,696,342 | 9/1987 | Yamauchi et al. | 165/152 |
| 4,723,601 | 2/1988 | Ohara et al. | 165/153 |
| 4,800,954 | 1/1989 | Noguchi et al. | 165/153 |

FOREIGN PATENT DOCUMENTS

| | | | |
|---|---|---|---|
| 73221 | 10/1951 | Denmark | 165/140 |
| 56-42090 | 4/1981 | Japan | 165/146 |

*Primary Examiner*—Allen J. Flanigan
*Attorney, Agent, or Firm*—R. L. Phillips

[57] ABSTRACT

A heat exchanger having a plurality of flat and elongated tube passes operatively interconnected therein with inlet and outlet openings adjacent to one another so that refrigerant flowing therethrough can transfer the heat energy from a cross flow of air streaming between the tube passes. The tube passes have a divider rib offset so that the volume on the outlet or increased quantity side of each pass is greater than the volume on the inlet or low quantity vapor side. With a large volume available for vapor expansion, pressure drop is minimized and heat transfer performance is maximized in the heat exchanger.

6 Claims, 3 Drawing Sheets

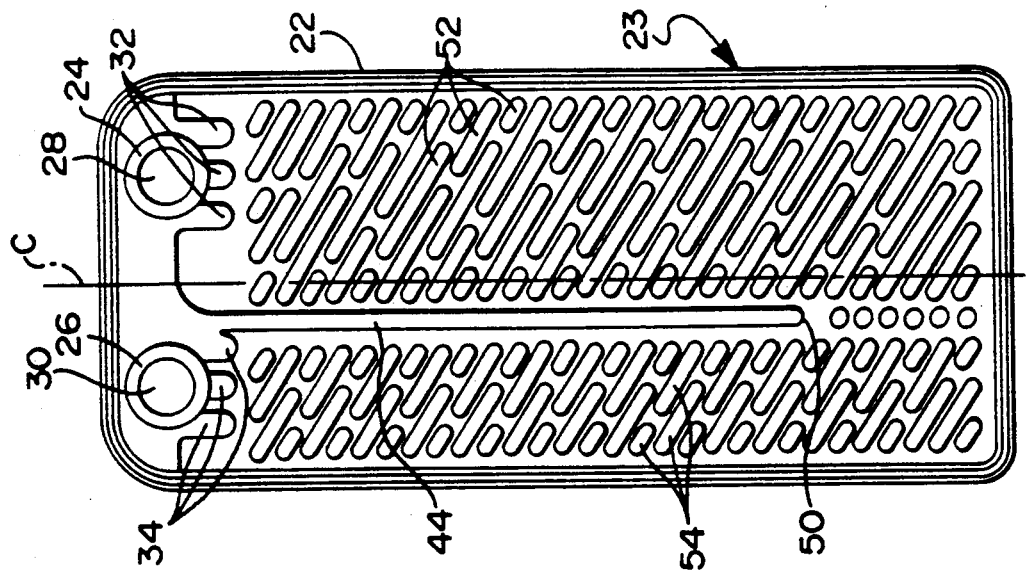
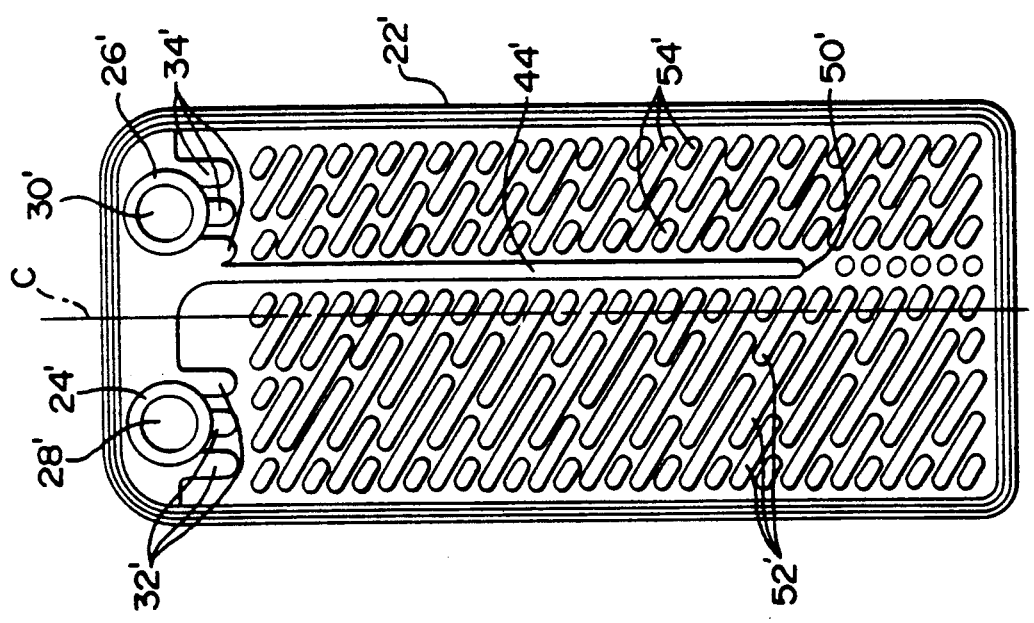
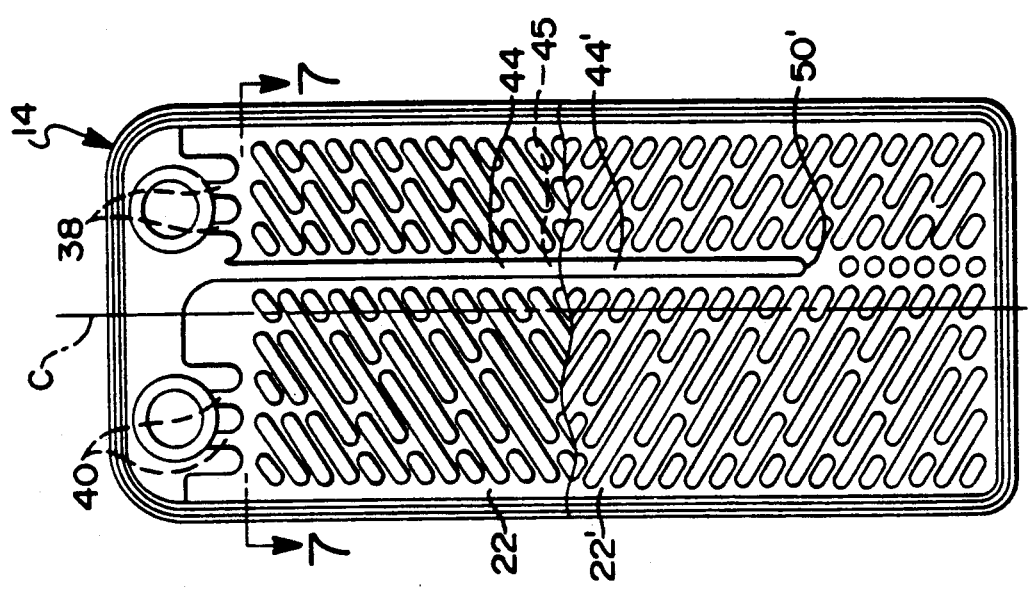

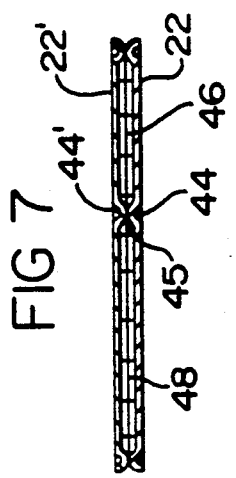
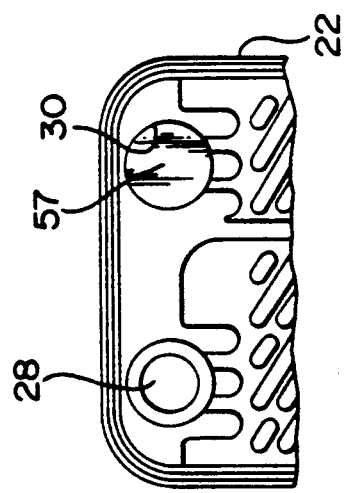
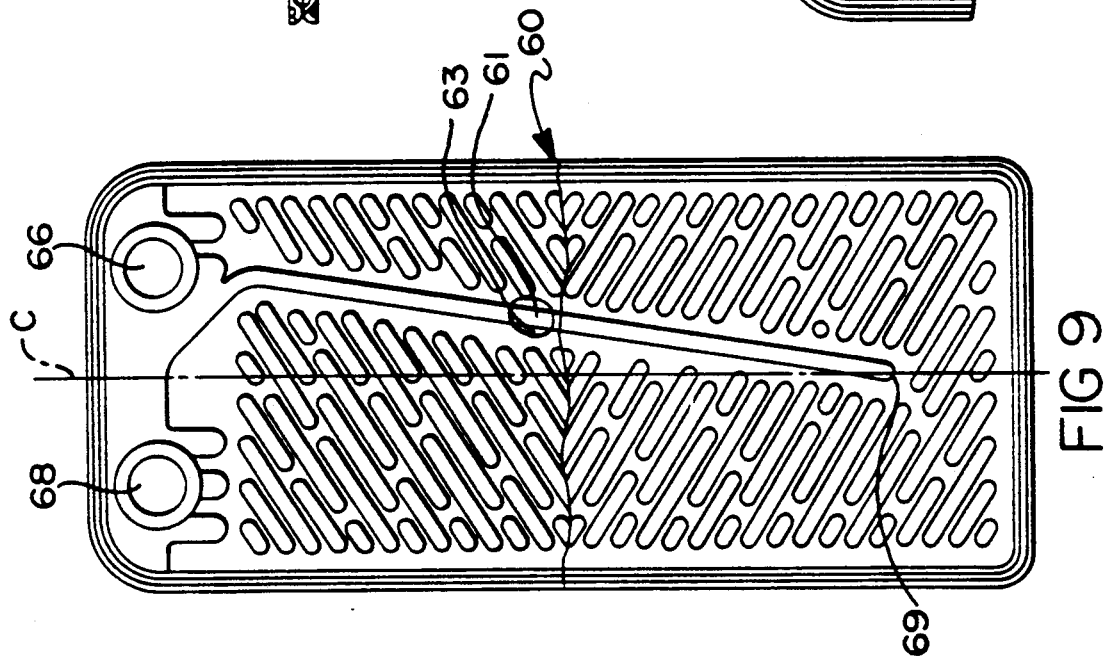
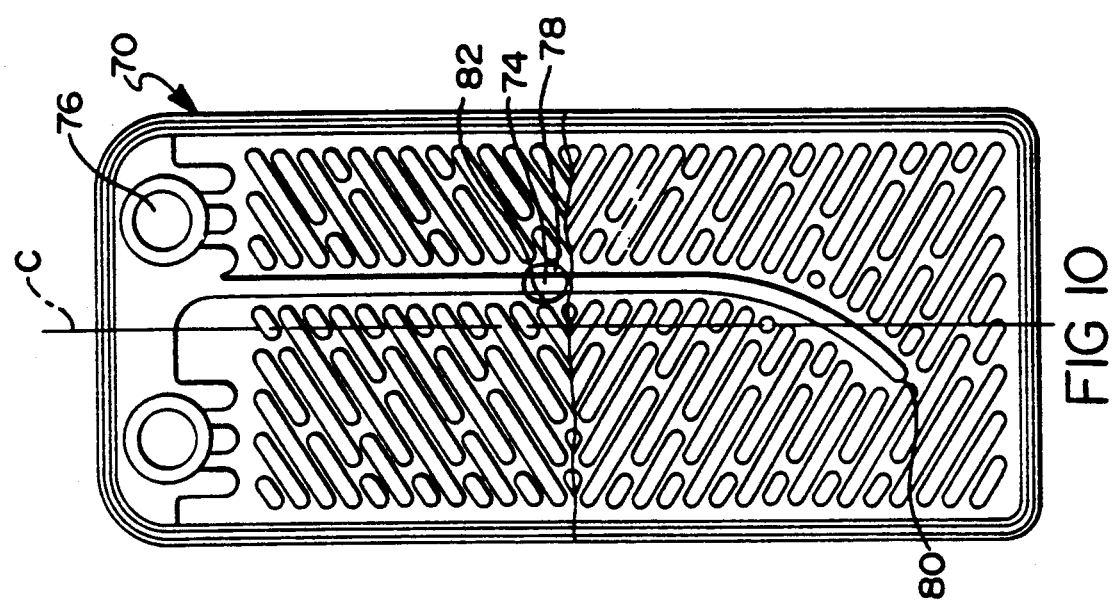

TUBULAR PLATE PASS FOR HEAT EXCHANGER WITH HIGH VOLUME GAS EXPANSION SIDE

TECHNICAL FIELD

This invention relates to heat exchangers having plate-type fluid flow tube passes and more particularly to a new and improved tubular U-flow plate pass an offset divider rib so the outlet side volume is sufficiently greater than the inlet side volume to minimize pressure drop and optimize heat transfer performance.

BACKGROUND ART

Prior to the present invention, various tube type fluid passes have been employed for heat exchangers such as an evaporator for an automotive air conditioning system. The core of such evaporators may employ a plurality of flattened plate passes operatively interconnected and each having discrete plate members sealed at their peripheral edges and at a mid rib to form a "U-shaped" refrigerant flow passage between inlet and outlet openings. These plates are also configured with bumps formed in patterns in the flow passage to vary the flow path of the refrigerant to improve heat transfer performance and to increase burst strength. While such constructions operate effectively, it is desirable to decrease the pressure drop across the heat exchangers and improve their heat transfer efficiencies.

PRESENT INVENTION

In view of the above, the present invention provides a divider rib offset in various configurations from the center line in discrete plate passes of a heat exchanger through which a refrigerant can flow such that the volume or open area on the outlet side (i.e., increased vapor quantity side), is greater than the volume or open area on the inlet side (low vapor quantity side). With a larger volume available for vapor expansion in the outlet side when the volatile liquid flowing into the heat exchanger side is evaporated, pressure drop is minimized and heat transfer performance is maximized within a given heat exchanger size.

It is a feature, object and advantage of this invention to provide a new and improved flat type plate tube pass construction for a heat exchanger with an elongated flow divider rib defining tube inlet and outlet sides for refrigerant flow therethrough which is offset from the center of the tube pass such that the overall volume of the flow passage is greater on the outlet side than the inlet side to provide increased area for refrigerant expansion as it vaporizes to reduce pressure drop across the pass and increase its heat transfer efficiency.

It is another feature, object and advantage of this invention to provide a heat exchanger featuring a new and improved plate type flow pass with a divider rib offset in such a manner so that the volume or open area on the outlet side is greater than the volume or open area on the inlet side so that pressure drop is minimized and heat transfer performance is maximized as volatile fluid flows therethrough.

These and other features, objects and advantages of this invention will become more apparent from the detailed description and drawing in which:

DESCRIPTION OF THE DRAWINGS

FIG. 4 is a plan view of one side of one of the plate passes of the evaporator core taken generally along lines 4—4 of FIG. 2.

FIG. 5 is a plan view of the opposite side of one of the plate passes of the evaporator core taken generally along lines 5-5 of FIG. 2.

FIG. 6 is a plan view with parts broken away and taken generally along lines 6—6 of FIG. 2 showing the evaporator plates of FIGS. 4 and 5 joined together to form a tube pass.

FIG. 7 is a sectional view taken generally along lines 7—7 of FIG. 6.

FIG. 8 is a partial plan view taken generally along lines 8—8 of FIG. 2 showing the blockage of one of the plates.

FIG. 9 is a plan view similar to FIG. 6 illustrating a modification of the invention, and FIG. 10 is a view similar to FIG. 9 showing another modification of the invention.

DETAILED DESCRIPTION OF THE DRAWING

Figure 1:
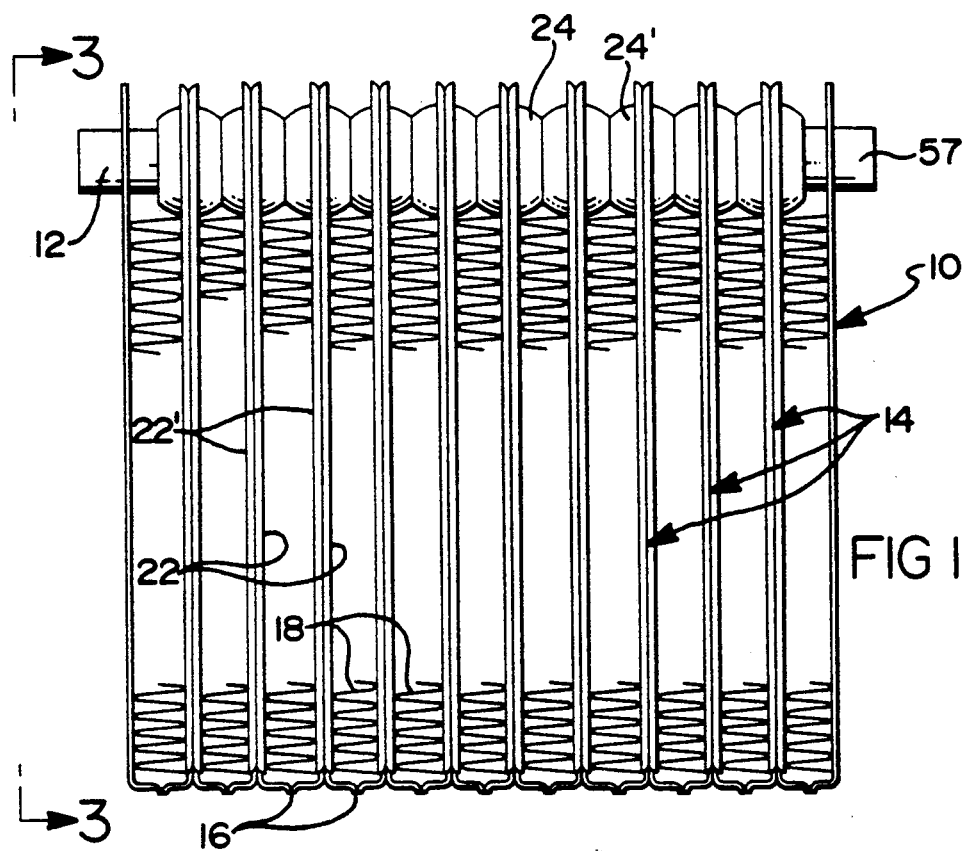
FIG. 1 is a front elevational view of an evaporator core of an automotive air conditioning system.

Turning now in greater detail to the drawings, there is shown in FIG. 1 a finned cross-flow tubular heat exchanger 10 such as an evaporator of an automotive air conditioning system, which evaporator is conventionally mounted in a module within the engine compartment of the automobile. This evaporator is supplied with pressurized volatile liquid refrigerant such as freon from a condenser, not shown, through a line that connects to an intake pipe 12 of the heat exchanger.

The heat exchanger 10 comprises a plurality of coolant conducting flat tubes 14 held at their lower ends in spaced parallel arrangement by spacers 16 to accommodate the corrugated centers or heat conducting fins 18 mounted between the flat tubes 14 increasing the heat transfer performance of the heat exchanger. A cross-flow of air through the fins 18 loses heat energy to the refrigerant which boils and vaporizes as it flows through the tube passes of the exchanger core.

Figure 3:
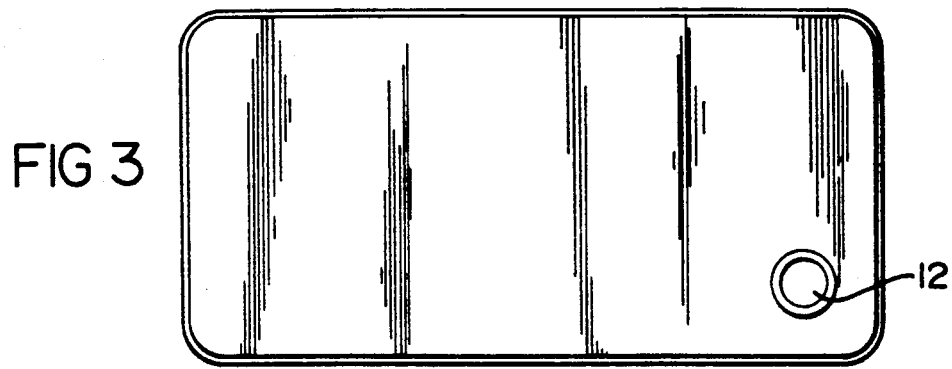
FIG. 3 is an end view of the evaporator core of FIG. 1.

Each tube 14 is fabricated from a pair of mating core plates exemplified by inner core plate 22 and outer core plate 22' shown in detail in FIGS. 3, 4 and 5, respectively. These core plates are stampings from thin sheets of aluminum or other suitable material and are generally rectangular in plan with rounded off corners. At the upper ends of plates 22, 22' are generally conical and truncated protuberances 24, 26 and 24', 26' that project outward from the general plane of each plate and, with the exception of the single end plates have round shaped openings 28, 30 and 28', 30' therein. These interconnected protuberances define conventional tank portions for the refrigerant flow.

Projecting downward from the inner edge of each of the openings 28, 30, 28', 30' are three laterally spaced and inwardly raised refrigerant flow guides 32, 34 and 32', 34', respectively, which when mated provide refrigerant flow passages 38, 40 therebetween as illustrated in FIG. 6.

In addition to the inwardly raised flow guides, each core plate 22, 22' has an elongated, inwardly raised divider rib 44, 44' which extends about ¾ the length of each plate and which contact one another and are brazed together to form a partition 45, FIG. 7, to separate the tube 14 into refrigerant flow passages 46, 48 so that the refrigerant flows therethrough from back to front or front to back in a general, circuitous path from one opening around the free end of the partition 45, formed by the ends 50, 50' of the divider rib, to the other opening.

In addition to the divider ribs, each core plate 22, 22' has a pattern of small shaped ribs or bumps 52, 54 and 52', 54' which are joined at their intersections, when the core plates are conventionally brazed together in face to face relationship. These bumps provide a range of flow paths within the respective tubes so that some measure of flow deviation of the refrigerant is produced and heat transfer efficiency is increased. These bumps can be arranged in any suitable pattern to optimize mechanical strength and provide for effective transfer of heat energy between the refrigerant, tube plates and fins.

Importantly, in this invention, the divider ribs 44, 44' providing partition 45 for each tube 14 are offset from the center line C of the inner and outer core plate 22, 22' so that the volume of passage 48 on the outlet side of the tubes is greater than the volume of passage 46 on the inlet side of the tubes. When the volatizing liquid turns around the end of the partition 45 and is further evaporated, a large volume is accordingly provided by this invention for vapor expansion so that pressure drop is minimized and heat transfer performance is maximized for each tube and for the heat exchanger package.

Figure 2:
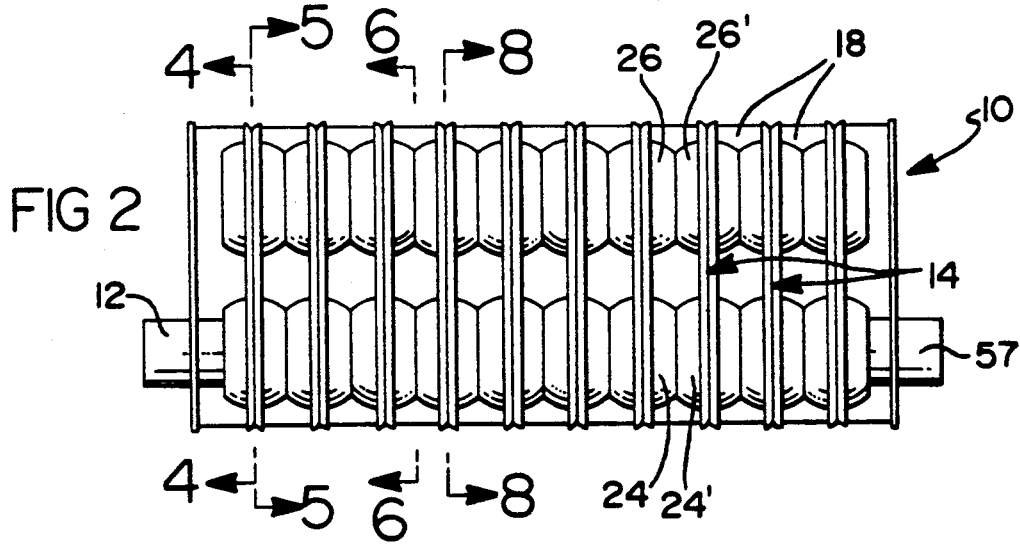
FIG. 2 is a top plan view of the evaporator core of FIG. 1.

In the heat exchanger of FIGS. 1 and 2, the first four tubes 14 have their smaller volume refrigerant flow passages on the front side of the heat exchanger (i.e. the side facing the viewer in FIG. 1) and their larger volume passage 48 on the back side. The opening 30 of the plate 22 of the fourth tube 14 is blocked by filler 57 as shown in FIG. 8 so that all of the refrigerant delivered to the intake side of the fourth tube pass will be forced to flow into the expansion side thereof and then into the smaller volume intake side of the fifth tube which has been turned 180° as compared to the position tubes 1-4 Accordingly, the low volume intake side of the fifth tube is located on the back side of the heat exchanger and the high volume outlet side of the fifth tube is at the front of the heat exchanger. The remaining tubes are oriented the same as the fifth tube so that the refrigerant will flow completely through both sides of the flat tubes of the four and six plate sections of the heat exchanger and out of the exhaust pipe 57 leading from the expansion side of the sixth tube into the compressor (not shown).

FIG. 9 shows an alternative embodiment of the flat tube pass of this invention. This tube 60 is similar to tube 14 and can be used as the tube passes in a heat exchanger such as heat exchanger 10. This tube has an inclined rib 61 that provides for a linear increase in cross-sectional area within the expansion side 63 of the tube as the refrigerant flows from inlet opening 66 to the outlet opening 68 around the terminal end 69 of rib 61. The preferred position of the end of the rib is either on the center line C or to the right or low volume side thereof as illustrated in FIG. 9. However, a rib terminating to the left of the center line may be used in some special situations to vary the flow distribution.

In an evaporator with more than two sections of passes, this inclined divider rib may provide for a reduced cross-sectional area for expansion in the third pass section. To compensate for this reduction, the evaporator can have an arrangement of a first section with seven plates and a second section with eight plates or can be changed to a first section with six plates and a second section with nine plates. This arrangement can vary in accordance with the angle of the divider rib.

FIG. 9 illustrates another embodiment of a flat tube pass 70 according to this invention which can be used in the heat exchanger to replace tubes 14. In this embodiment, the divider rib 74 can be wholly or partially curved instead of straight. The curve of the divider rib can be determined analytically or experimentally to provide an advantageous flow distribution as the refrigerant flows from inlet opening 76 through flow passage 78 around the end 80 of the rib, through the large volume expansion passage 82 and then out of the outlet opening 84 into the next tube. The curvature of rib may depend on the rate of evaporation of the refrigerant selected for use in the heat exchanger While the above description constitutes preferred embodiments of the invention, it will be appreciated that the invention can be modified and varied without departing from the scope and fair meaning of the accompanying claims.

What is claimed is:

1. A plate-type heat exchanger comprising a series of flat fluid flow tubes, each of said tubes being composed of a pair of confronting core plates of thin wall metal cooperating to define an inlet passage and an outlet passage for the flow of gas and liquid refrigerant therethrough, each of said tubes having an inlet hole for introducing a gas and liquid refrigerant into said inlet passage and an outlet hole for discharging the refrigerant from said outlet passage, said tubes having an elongated center line generally extending between said inlet and outlet passages and having a plurality of ribs on inner wall surfaces thereof which project into said flow passages, each of said tubes having a single divider partition formed by elongated offset means in at least one of said core plates and extending from an origin generally between said inlet and outlet holes and having a portion curved with respect to said center line, each said divider partition terminating short of the end of the associated tube to separate said inlet passage and said outlet passage and to thereby provide a generally U-shaped flow course that has a volume greater in said outlet passage than said inlet passage to accommodate the expansion of said refrigerant as it changes from liquid to a gaseous phase as said refrigerant flows to said outlet hole.

2. A heat exchanger comprising a plurality of substantially flat tube pass means operatively connected to form a heat exchanger core and operatively interconnecting an inlet for transmitting a flow of fluid into said heat exchanger to an outlet for transmitting the flow of fluid from said heat exchanger, each of said tube pass means having a vertical center line, a single divider rib means in each of a number of said flat tube pass means offset from the center line thereof and having an end portion curved with respect to said center line to separate said last mentioned flat fluid pass means into upstream and downstream sides and so that the fluid flows therethrough in a generally U-shaped path and the volume of the downstream side is greater than the volume of the upstream side to minimize pressure drop in the heat exchanger and maximize the heat transfer performance thereof.

3. A substantially flat tube pass for a heat exchanger comprising a pair of flat plate means operatively connected together in face to face relationship, said tube pass providing for the flow of refrigerant therethrough and having a longitudinal center line and refrigerant inlet and outlet openings therein disposed on opposite sides of said center line, a single divider rib means extending in a general longitudinal path in said tube pass and having a discrete terminal end, said divider rib means having a major portion offset from the center line of said tube pass and having a terminal end curved with respect to said center line to separate said tube pass into upstream and downstream sides so that the refrigerant generally flows in a generally U-shaped course through said tube pass and from said inlet to said outlet opening and so that the volume of the downstream side is greater than the volume of the upstream side to provide increased space for said refrigerant as it changes from a liquid phase to a gaseous phase.

4. The tube pass of claim 3 wherein said divider rib means is inclined with respect to the center line of said tube pass.

5. A substantially flat tube pass for a heat exchanger comprising a pair of flat plate means having refrigerant inlet and outlet openings therein, said tube pass having a center line, an elongated divider rib means for said tube pass means, said divider rib means being offset from the center line of said tube pass to separate said tube pass into upstream and downstream sides and in which the volume of the downstream side is greater than the volume of the upstream side and wherein said divider rib means is curved with respect to said center line.

6. A flattened tube pass for a heat exchanger comprising first and second plates of thin wall metal adapted to be secured to one another in a fluid tight manner so as to define refrigerant inlet and outlets adjacent to one another on opposite side of a center line in said pass for transmitting volatile refrigerant liquid supplied thereto, a single divider rib formed by an elongated depression in said plates and extending longitudinally in said tube pass from an origin between said inlet and said outlet to separate said tube pass into an inlet passage and an outlet passage, said divider rib offset from said center line having a discrete terminal end within said pass which is curved with respect to said center line so that said inlet and outlet passages hydraulically communicate with one another to provide a generally U-shaped flow course, said divider rib being configured and located in said tube pass so that said outlet passage provides a volume greater than that of said inlet passage to minimize the pressure drop when a volatile liquid flowing through said tube pass experiences a change in state from the heat of vaporization of air passing through said tube pass of said heat exchanger.

* * * * *